United States Patent [19]
Hosoda et al.

[11] Patent Number: 5,516,247
[45] Date of Patent: May 14, 1996

[54] FASTENING DEVICE

[75] Inventors: Yuji Hosoda, Ibaraki; Eisaku Hayashi; Masanori Suzuki, both of Hitachi, all of Japan

[73] Assignee: Hitachi, Ltd., Tokyo, Japan

[21] Appl. No.: 292,282

[22] Filed: Aug. 18, 1994

[30] Foreign Application Priority Data

Aug. 25, 1993 [JP] Japan .................................. 5-210129

[51] Int. Cl.⁶ ............................ F16B 39/00; F16B 39/28
[52] U.S. Cl. ............................. 411/83; 411/87; 411/166; 411/427
[58] Field of Search .................................. 411/81, 86, 88, 411/90, 166, 169, 427, 966, 967, 83, 87

[56] References Cited

U.S. PATENT DOCUMENTS

| | | | |
|---|---|---|---|
| 133,694 | 12/1872 | Bishop | 411/90 |
| 733,915 | 7/1903 | Pike | 411/90 |
| 1,937,109 | 11/1933 | Colt | 411/427 |
| 4,329,097 | 5/1982 | Steele et al. | 411/88 |

*Primary Examiner*—Neill R. Wilson
*Attorney, Agent, or Firm*—Antonelli, Terry, Stout & Kraus

[57] ABSTRACT

The invention is a fastening device for fastening a plurality of structures using a bolt and a nut. At least two bolts are provided each having a screw portion at one end. At least one nut is provided for each of the bolts. The nut has a flange having a diameter greater than a distance between axes of the bolts with relative rotation of the nuts being restricted by fixing mutually overlapping portions of the flanges of the nuts threaded on the bolts to each other.

6 Claims, 6 Drawing Sheets

FASTENING DEVICE

BACKGROUND OF THE INVENTION

1. Field of the Invention

The present invention relates to a fastening device for structures which employ bolts and nuts, and more particularly, to a fastening device suitable for use in, for example, repair work in a nuclear reactor pressure vessel.

2. Description of the Invention

In the conventional fastening method of structures using bolts and nuts, performed in a structure making or repair work in a nuclear reactor pressure vessel, after the bolts and nuts have been fastened to the structures, welding is performed to fix the structures to the nuts or the nuts to the bolts to prevent loosening of the nuts.

Structure fastening using bolts and nuts which does not employ welding may be performed 1) by using a spring washer, 2) by using a lock nut, 3) by deforming a split nut with a small screw, 4) by abutting a metal piece to a side surface of the nut, 5) by passing a split pin through the bolts and nuts, 6) by bending or caulking part of a washer having a claw which is brought into engagement with the bolt or a portion of the structure to fix the nut, 7) by using a nut having a structure in which an end surface thereof which faces the structure is elastically deformed or 8) by striking part of the nut to bite it into the bolt. These methods are described from page 731 to page 733 in the Handbook of Machine Design edited by the editorial committee of Handbook of Machine Design and published by Maruzen.

When any of the above-mentioned conventional methods is applied to, for example, the repair work of structures in a nuclear reactor pressure vessel, it is difficult to introduce a welding device into the reactor, because the interior of the reactor is narrow. Further, since the welding work must be performed in air to secure reliability of the welding, if the welding device is of the type having a waterproof operation and thus has a large size, it is difficult to introduce it into the reactor. Where a welding device having no waterproof operation is employed, the draining operation of water in the nuclear reactor is necessary, thus prolonging the repair work.

When any of the above-described methods from 1) to 6) is applied to, for example, the repair work of a nuclear reactor pressure vessel, parts, such as washers or split pins, must be mounted to prevent rotation of the nut relative to the structure or the bolt in a remote controlled operation, making the repair work complicated and producing lost articles in the reactor.

The conventional methods shown in 1), 2), 3), 7) and 8) involve fixing the rotation of the nut by an increase in the frictional force between the nut and the structure or between the nut and the bolt. However, loosening of the nut may occur during use due to changes in the frictional force with time caused by, for example, vibrations of the structure, making semi-permanent maintenance of the structure in the reactor unreliable.

SUMMARY OF THE INVENTION

An object of the present invention is to provide a device for fastening structures using bolts and nuts which facilitates a remote controlled fastening operation and which prevents loosening of the nuts effectively.

To achieve the above-described object, the present invention provides a fastening device for fastening a plurality of structures to each other using a bolt and a nut, which comprises at least two bolts each having a screw portion at one end, and at least one nut for each of the bolts, the nut having a flange having a diameter greater than a distance between axes of the bolts, relative rotation of the nuts being restricted by fixing mutually overlapped portions of the flanges of the nuts screwed on the bolts to each other.

The flanges of the two fastened nuts overlap, thus forming a coupled area. Rotation of one nut relative to the other is semi-permanently restricted and loosening of the nuts is thus prevented by plastically deforming the flanges or a rivet which passes the flanges.

DESCRIPTION OF THE PREFERRED EMBODIMENTS

Embodiments of the present invention will now be described with reference to the accompanying drawings.

Figure 1:
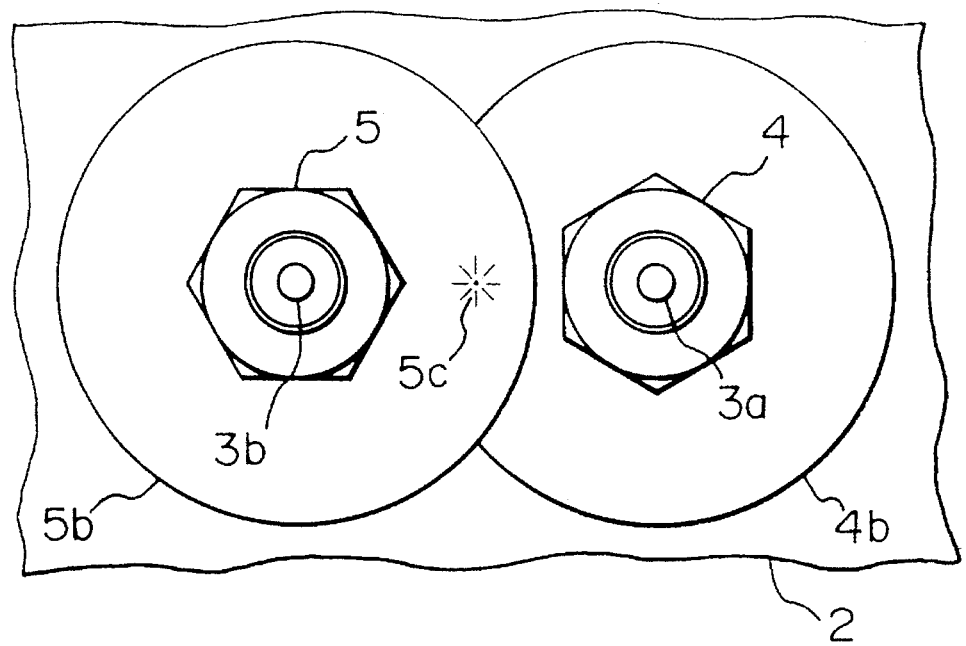
FIG. 1 is a plan view of an embodiment of a fastening device according to the present invention.
Figure 2:
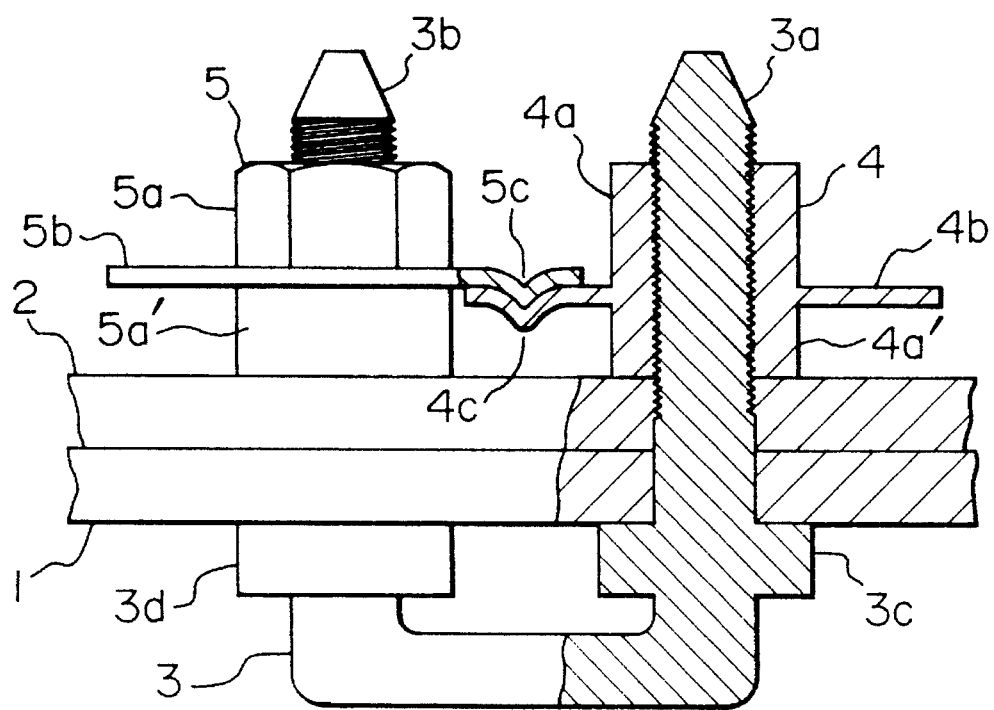
FIG. 2 is a side view, partly in cross-section, of the embodiment shown in FIG. 1.

FIGS. 1 and 2 are respectively plan and side views of an embodiment of a fastening device according to the present invention. In FIGS. 1 and 2, structures 1 and 2 are tightly fastened to each other by a bolt 3 and nuts 4 and 5.

The bolt 3 has a U-shaped form having parallel screw portions 3a and 3b. At an end portion of the bolt 3 for coupling the screw portions 3a and 3b to each other are provided flanges 3c and 3d for pressing against the structure 1.

The nuts 4 and 5 respectively have hexagonal portions 4a and 5a for the fastening operation. The nuts 4 and 5 further have disk-like shaped flanges 4b and 5b at end portions of the hexagonal portions 4a and 5a, respectively. The diameter of each of the flanges 4b and 5b is set to a value greater than a distance between the axes of the screw portions 3a and 3b so that the flanges 4b and 5b overlap when the nuts 4 and 5 are respectively fitted on the screw portions 3a and 3b.

The nuts 4 and 5 respectively have spacer portions 4a' and 5a' to form a predetermined gap between the flanges 4b, 5b and the top surface of the structure 2. The heights of the spacer portions 4a' and 5a' are set to values which ensure that an upper surface of the flange 4b comes into contact with an under surface of the flange 5b when the structures 1 and 2 are fastened first by the nut 4 and the screw portion 3a and then the nut 5 and the screw portion 3b. Also, the heights of the spacer portions 4a' and 5a' are set to adequate values which assure the operation of a device for fixing flanges, which will be described in detail.

After the structures 1 and 2 are fastened to each other by the bolt 3 and the nuts 4 and 5, the overlapping portion of the flanges 4b and 5b is plastically deformed by the application of a caulking force to the surface of the flanges 4b and 5b in a direction normal thereto to simultaneously form recessed spots 4c and 5c in the flanges 4b and 5b, respectively. The recessed spots 4c and 5c are engaged with each other, thus restricting relative rotation between the nuts 4 and 5 and preventing loosening thereof.

Figure 3:
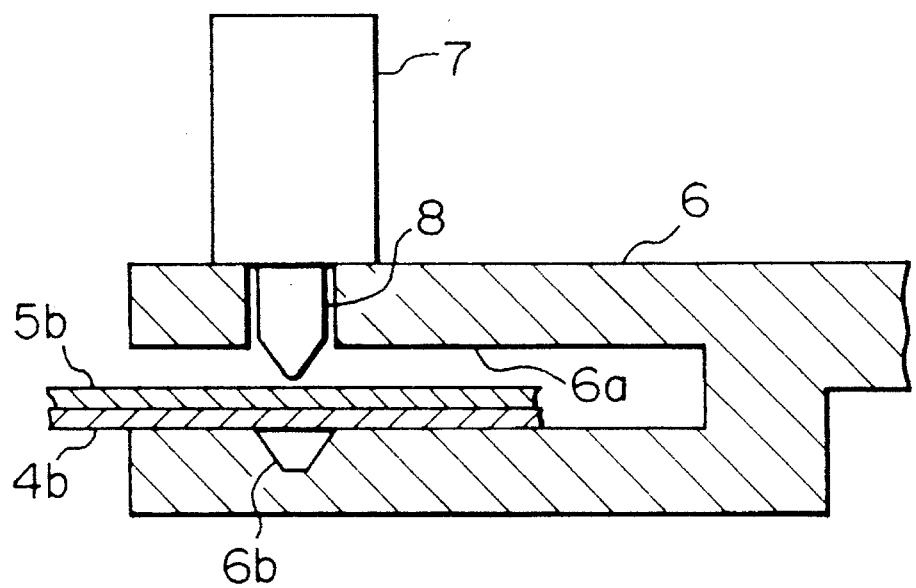
FIG. 3 is a side view showing a machining device for machining a recess in the embodiment shown in FIG. 1.

FIG. 3 shows the structure of a machining device for forming the recessed spots 4c and 5c in the device according to the present invention. The machining device includes a frame 6 having a slit 6a for placing the overlapped flanges 4b and 5b therein and a recessed portion 6b formed in the surface of the slit 6a, a pressurizing portion 7 provided on the frame 6 and constituted by, for example, a hydraulic cylinder, and a tapered pin 8 mounted on the pressurizing portion 7. The pin 8 is at a position coaxial with respect to the recessed portion 6b. To plastically deform the overlapped portion of the flanges 4b and 5b in a spot-like form, the overlapped portion is located in the slit 6a and then gripped between the pin 8 and the recessed portion 6b by the thrust of the pressuring portion 7.

In this embodiment, since the bolt 3 having a U-shaped form is used, rotation of the screwed portions 3a and 3b is restricted only by inserting the bolt 3 in mounting holes in the structures 1 and 2. Consequently, support for the rotation of the bolt is not necessary as compared with the fastening operation which employs a normal bar-shaped bolt, and support of the bolt can thus be readily performed by a remote controlled operation.

Further, since the nuts 4 and 5 have a loosening preventing function, the use of parts for preventing loosening is not necessary, thus simplifying the fastening operation and reducing the possibility that the parts are lost during mounting.

Further, since rotation of the nuts 4 and 5 is restricted by the engagement of the recessed portions 4c and 5c formed in the flanges 4b and 5b, the loosening preventing effect of the nut can be maintained so long as the recessed portions do not break.

Further, the machining device for forming the recessed portions 4c and 5c has a simple structure which enables the plate-like flanges 4b and 5b to be punched. Thus, the device can be readily made small in size so that it can be operated on a remote control basis in a narrow environment, such as in a nuclear reactor.

In this embodiment, the single recessed portion 4c and 5c are formed in the flanges 4b and 5b, respectively. However, a plurality of recessed portions may be formed in the flange 4b or 5b.

Figure 4:
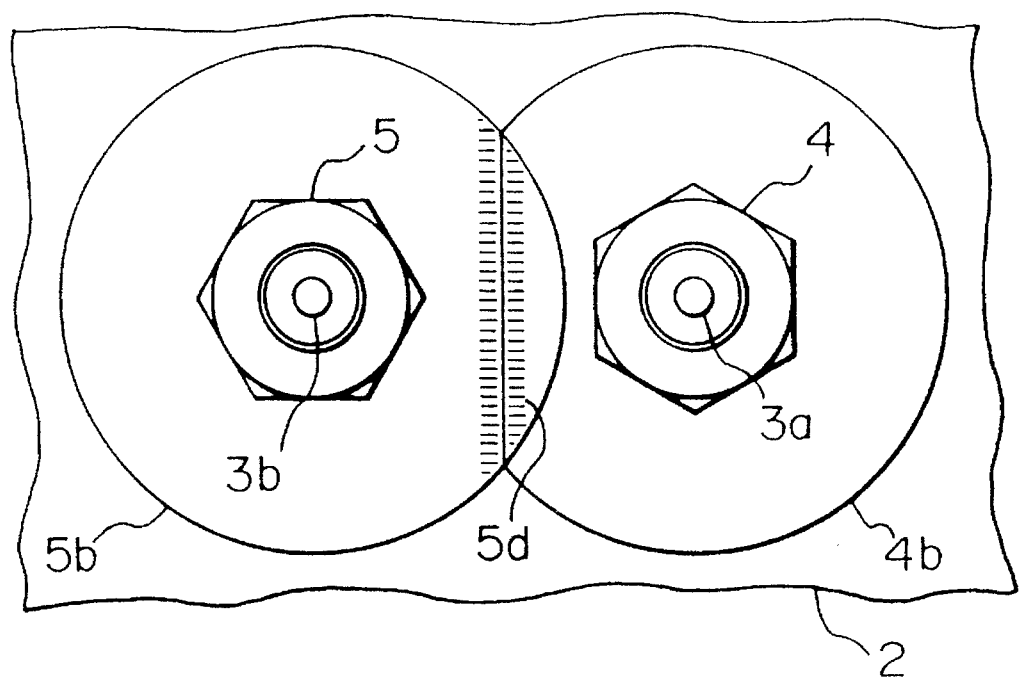
FIG. 4 is a plan view of another embodiment of the fastening device according to the present invention.
Figure 5:
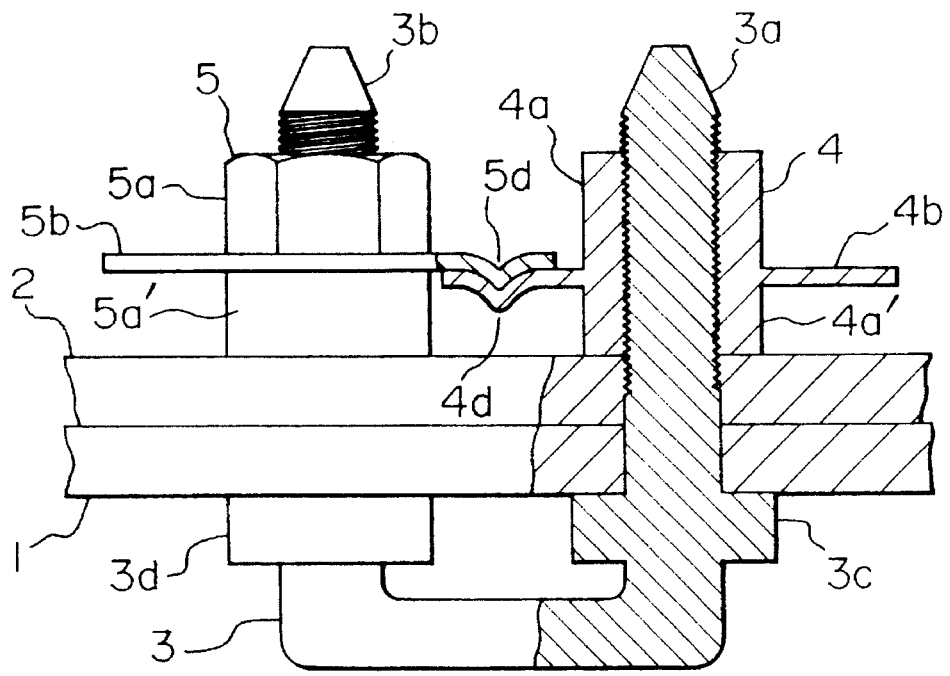
FIG. 5 is a side view, partly in cross-section, of the embodiment shown in FIG. 4.

FIGS. 4 and 5 are respectively plan and side views of another embodiment of the device according to the present invention. In these figures, identical reference numerals to those in FIGS. 1 and 2 represent similar or identical elements.

In this embodiment, the overlapped portion of the flanges 4b and 5b is plastically deformed by bending the surfaces of the flanges 4b and 5b in a direction normal thereto to simultaneously form linear bending portions 4d and 5d in the flanges 4b and 5b, respectively. The bending portions 4d and 5d engage with each other, thus restricting relative rotation between the nuts 4 and 5 and preventing loosening of the nuts 4 and 5.

In this embodiment, the area in which the flanges 4b and 5b engage with each other is larger than that of the embodiment shown in FIG. 1, and the reliability with which loosening of the nuts is prevented is improved.

In this embodiment, although the single bending portions 4d and 5d are respectively formed in the flanges 4b and 5b, a plurality of bending portions may be formed.

Further, the bending shape is not limited to a linear form and another shapes can also be employed. Further, the direction of bending can be freely selected so long as it allows bending to pass the overlapped portion of the flanges 4b and 5b.

Figure 6:
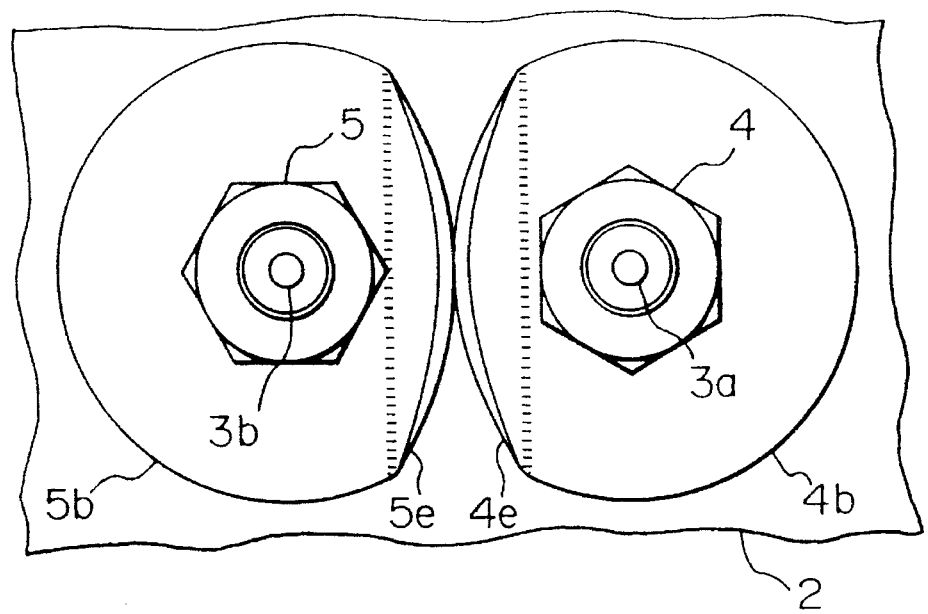
FIG. 6 is a plan view of another embodiment of the fastening device according to the present invention.
Figure 7:
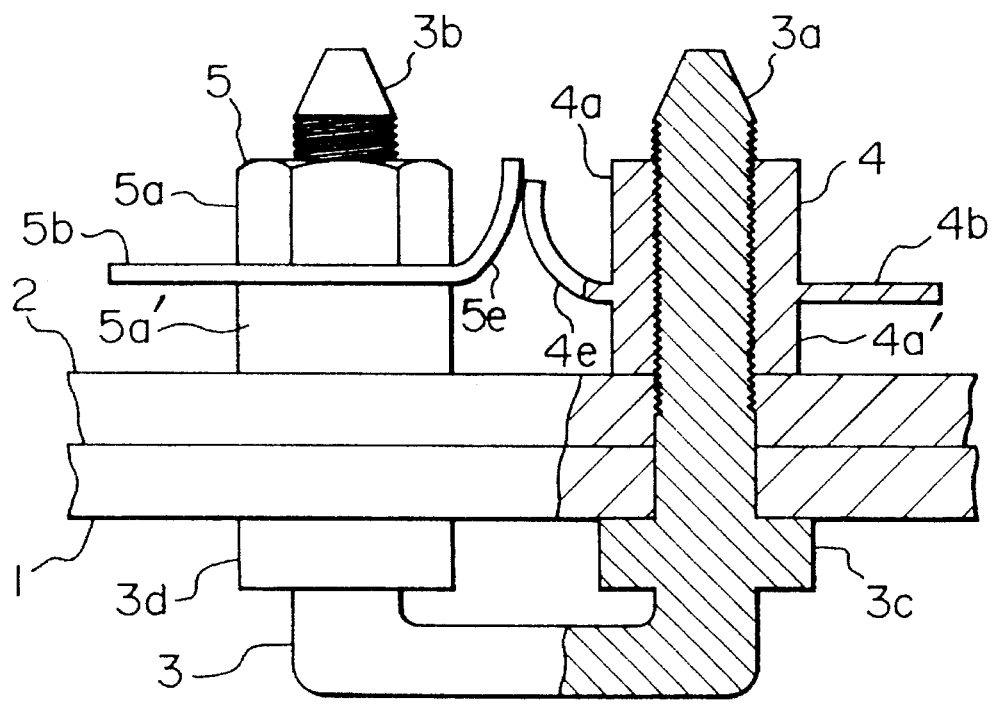
FIG. 7 is a side view, partly in cross-section, of the embodiment shown in FIG. 6.

FIGS. 6 and 7 are respectively plan and side views of still another embodiment of the device according to the present invention. In these figures, identical reference numerals to those in FIGS. 1 and 2 represent similar or identical elements.

In this embodiment, the end portions of the flanges 4b and 5b are curved by the application of a load to the overlapped portion of the flanges 4b and 5b from below the flange 4b in an upward direction to form abutting portions 4e and 5e which contact with each other. The abutting portions 4e and 5e contact with each other in the form of a straight line, and thereby restricting rotation of the nuts 4 and 5 and preventing loosening thereof.

Figure 8:
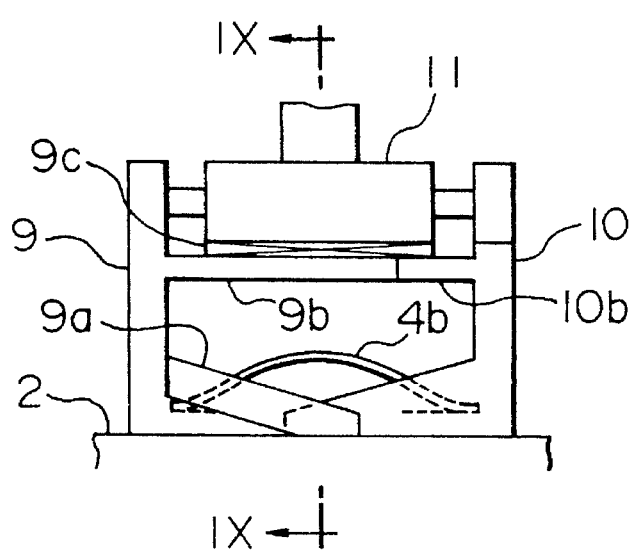
FIG. 8 is a side view showing a machining device used in the embodiment shown in FIG. 6.
Figure 9:
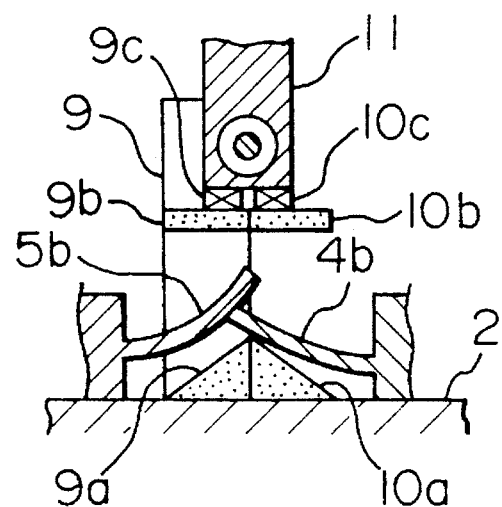
FIG. 9 is a cross-sectional view taken along the line IX—IX of FIG. 8.

FIGS. 8 and 9 show a machining device for forming the abutting portions 4e and 5e in another embodiment of the device according to the present invention shown in FIGS. 6 and 7.

The machining device has claws 9 and 10 having wedge-shaped edges 9a and 10a, respectively. The claws 9 and 10 are opened and closed by a driving portion 11 constituted by, for example, a hydraulic cylinder. The claws 9 and 10 are supported by the driving portion 11 through projecting portions 9b and 10b and slide bearings 9c and 10c. To form the abutting portions 4e and 5e, the claws 9 and 10 are opened and the edges 9a and 10a are placed on the structure 2. Thereafter, the claws 9 and 10 are closed to insert the edges 9a and 10a below the flange 4b which is to be deformed, and the flanges 4b and 5b are pushed upward by using the back of the edges 9a and 10a.

In this embodiment, since the cross-sectional form of the edges 9a and 10a of the machining device can be freely designed, even if the nuts 4 and 5 are small and the space below the flange 4b is thus narrow, prevention of the loosening of the nuts can be achieved.

Figure 10:
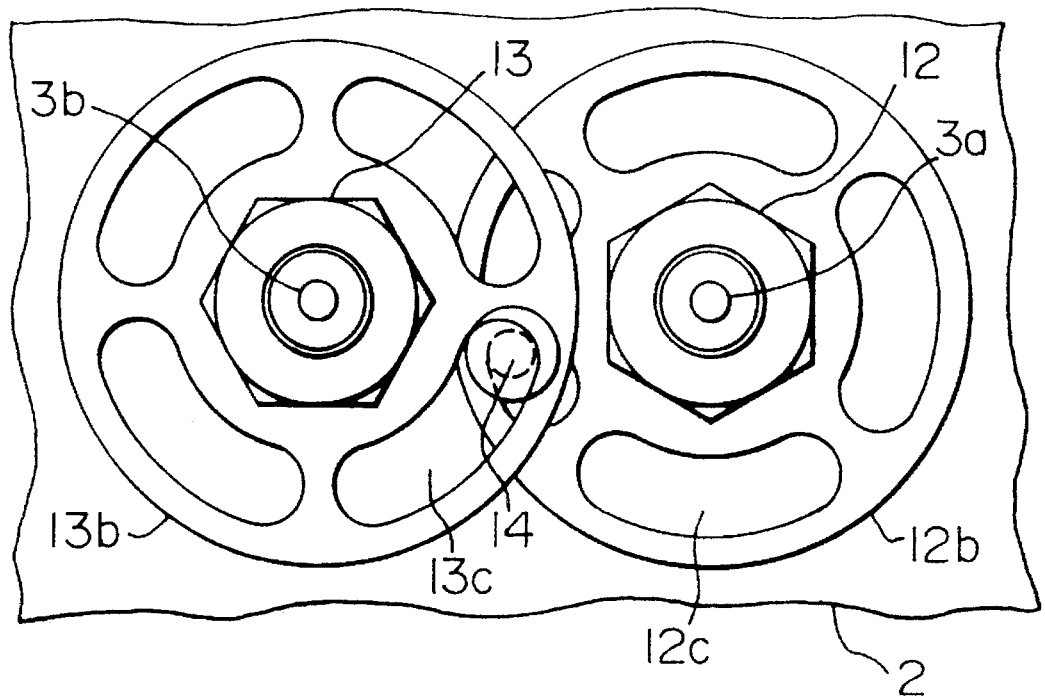
FIG. 10 is a plan view showing another embodiment of the fastening device according to the present invention.
Figure 11:
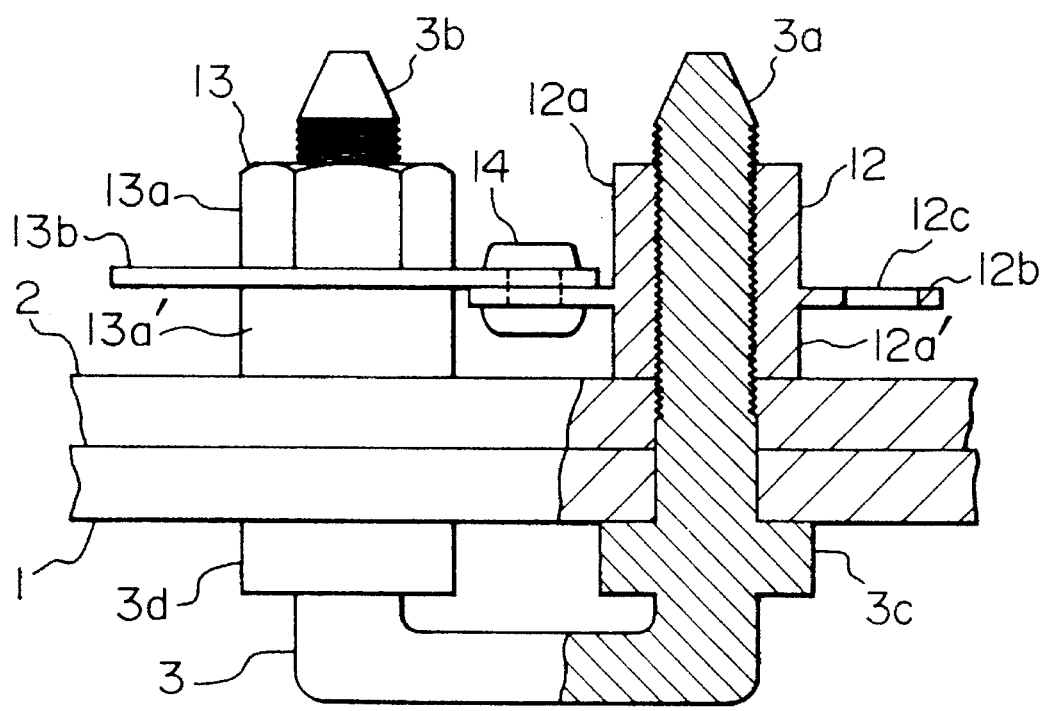
FIG. 11 is a side view, partly in cross-section, of the embodiment shown in FIG. 10.

FIGS. 10 and 11 are respectively plan and side views of another embodiment of the device according to the present invention. In these figures, identical reference numerals to those in FIGS. 1 and 2 represent similar or identical elements.

In this embodiment, flanges 12b and 13b of nuts 12 and 13 have arc-shaped holes 12c and 13c which pass the overlapped portion of the flanges 12b and 13b, respectively. Reference numerals 12a and 13a denote hexagonal portions for the fastening operation. Reference numerals 12a' and 13a' denote spacer portions for forming a predetermined gap.

In this embodiment, the flanges 12b and 13b have four holes 12c and 13c, respectively. Since the circumferential length of the holes 12c and 13c is longer than the longitudinal length of the overlapped portion of the flanges 12b and 13b, the holes 12c and 13c can be made overlapped on the overlapped portion of the flanges 12b and 13b regardless of the relative rotational position of the nuts 12 and 13. Rotation of the nuts 12 and 13 is restricted by passing a rivet 14 through an overlapped portion of the holes 12c and 13c located on the overlapped portion of the flanges 12b and 13b and then by riveting the rivet 14.

In this embodiment, loosening of the nuts can be prevented without plastically deforming the flanges 12b and 13b. The material of the rivet can be freely selected. Therefore, reliability of fastening can be improved by selecting a material of the rivet which exhibits higher corrosion resistance and higher aged fatigue resistance when plastically deformed than the material of the nuts 12 and 13.

In this embodiment, the number of holes in each of the flanges 12b and 13b is four. However, any number larger than two can be selected to obtain the same effect as that obtained with four holes.

Figure 12:
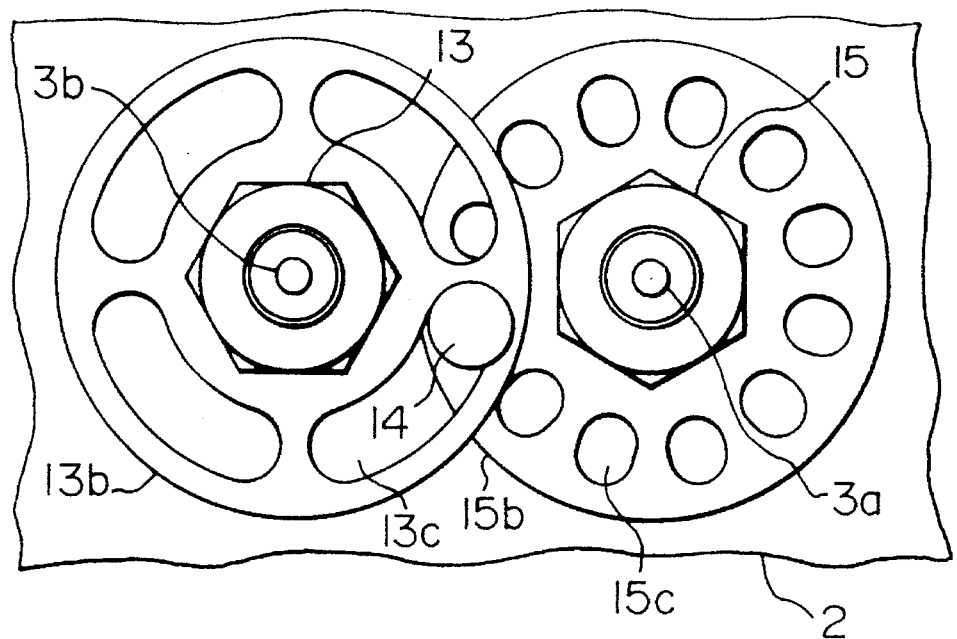
FIG. 12 is a plan view of another embodiment of the fastening device according to the present invention.

FIG. 12 is a plan view of another embodiment of the device according to the present invention. In FIG. 12, identical reference numerals to those in FIGS. 10 and 11 represent similar or identical elements.

In this embodiment, a plurality of holes 15c are radially formed in a flange 15b of a nut 15. The hole 15c has a width larger than the outer diameter of the shaft of the rivet 14, and is elongated in a radial direction of the flange 15b. The holes 15c are formed at a pitch which ensures that part of the hole 15c overlaps the hole 13c at an arbitrary rotational position of the nuts 13 and 15 so that the rivet 14 can be passed therethrough.

In this embodiment, since the width of the hole 15c can be set to a value which is equal to the outer diameter of the shaft of the rivet 14, the area in which the riveted rivet 14 is in contact with the flange 15b becomes larger than that of the embodiment shown in FIG. 10, thus making riveted more reliable.

As will be understood from the foregoing description, in the present invention, a welding operation, which would be conventionally required to prevent loosening of the fastened bolts in the repair work of a structure in a nuclear reactor pressure vessel, is not required, and the nut can be fixed only by performing plastic deformation on the nut and flange. Consequently, the loosening preventing operation of a fastened bolt can be performed more effectively by a simpler remote controlled operation.

Further, since the machining device for performing plastic deformation on the nut and flange can be readily made small, the loosening prevention operation can be performed under a narrow environment into which a welding device cannot be introduced.

Furthermore, since an underwater remote controlled operation is possible, the operation of a reactor water is not necessary, thus shortening the repair work.

Further, since mounting of a special part is not required to prevent loosening of the nut, unlike a conventional nut loosening prevention means which employs, for example, a washer or a split pin, the loosening prevention operation can be simplified, and the possibility that the part is lost due to the remote controlled operation can be reduced.

What is claimed is:

1. A fastening device for fastening a plurality of structures using a bolt and a nut, said device comprising:

at least two bolts each having a screw portion at one end; and at least one nut for each of said bolts, said nut having a flange having a diameter greater than a distance between axes of said bolts with relative rotation of said nuts being restricted by fixing mutually overlapping portions of said flanges of said nuts threaded on said bolts to each other.

2. A fastening device according to claim 1, wherein end portions of said at least two bolts, which are remote from said screw portions, are coupled to each other.

3. A fastening device according to claim 1, wherein recessed portions are formed in surfaces of said overlapped flanges by applying a load to an area where said flanges overlap from an outside of said flange surfaces, and are brought into contact with each other to restrict rotation of said nuts.

4. A fastening device according to claim 1, wherein end portions of said overlapped flanges are curved in a direction outward from the surfaces of said flanges by applying a load to an area where said flanges overlap from a point below said flanges, and the curved end portions are brought into abutment with each other to restrict rotation of said nuts.

5. A fastening device according to claim 1, wherein at least two arc-shaped holes are formed in each of said flanges in such a manner that said holes pass an area where said flanges overlap, and wherein a rivet is inserted into an area where said arc-shaped holes of said flanges overlap and is riveted to restrict rotation of said nuts.

6. A fastening device according to claim 1, wherein at least two arc-shaped holes are formed in said flange of said one nut in such a manner that said holes pass an area where said flanges overlap, while at least two holes are formed radially in said flange of said other nut in such a manner that said radial holes pass an area where said flanges overlap, and wherein a rivet is inserted into an area where said arc-shaped holes of said flange overlap said radial holes of said other flange and is riveted to restrict rotation of said nuts.

* * * * *